July 11, 1961   W. F. MARSCHER ET AL   2,991,618
HELICOPTER ROTOR SPEED CONTROL SYSTEM
Filed July 3, 1959

INVENTORS
ROBERT F. OWENS
ROBERT G. FRASER
BY WILLIAM F. MARSCHER
Lawrence G. Norris
ATTORNEY

United States Patent Office 2,991,618
Patented July 11, 1961

2,991,618
HELICOPTER ROTOR SPEED CONTROL SYSTEM
William Frederick Marscher, Marblehead, Robert Frank Owens, West Newbury, and Robert Gerard Fraser, Lynnfield, Mass., assignors to General Electric Company, a corporation of New York
Filed July 3, 1959, Ser. No. 824,804
1 Claim. (Cl. 60—39.28)

Our invention relates to speed control systems for turbo shaft engines and in particular to a speed control system for a gas turbine engine wherein a free turbine is utilized to drive a helicopter rotor.

A fuel control system for turbo shaft helicopter power plants has been suggested which automatically maintains the speed of the helicopter rotor at a pre-selected setting without the necessity of pilot manipulation of the engine speed controls. Such a system allows the pilot to set a pre-selected desired speed of the rotor and then manually manipulate the switch control of the rotor to vary the power delivered to the rotor, the speed control acting automatically to increase or decrease the rate at which fuel is supplied to the engine so that the pre-selected rotor speed is maintained. In some cases the speed control is of the so-called droop type which allows the rotor speed to decrease slightly with increasing load. In general, however, the amount of droop provided is small in comparison with the no load speed, being usually less than ten percent of the no load speed value.

At any rate, the general philosophy of the foregoing type of control is to allow the pilot to vary the amount of power delivered to the rotor system by manually controlling the pitch of the rotor, the fuel control system automatically adjusting the fuel flow rate to the engine in response to changes in the output speed to maintain the speed at the pre-set level. Speed control systems of this general type are commonly used in gas turbine engines in which the power output of the engine includes a free powered turbine connected to drive the helicopter rotor to a suitable transmission comprising a gear and shaft system.

In speed control systems of the foregoing type, it is a common practice to locate the speed sensor element of the speed control system on the engine so as to sense the speed of the free powered turbine and provide for adjustment of the engine fuel flow rate in response to changes in the speed of the power turbine from the pre-set level. In such a system, if the pitch of the rotor is increased, the resulting increased load on the power turbine causes its speed to be reduced, thereby delivering a signal through the speed sensor to cause the speed control to increase the fuel flow to the engine and thereby increase its power output to maintain the output speed substantially constant. Similarly, a decrease in rotor pitch tends to cause a speed increase which reduces the fuel flow to the engine to decrease the power output. It has been found, however, that in certain helicopter installations using a speed control system of the foregoing type, there occurs a tendency on the part of the speed control loop to be undesirably oscillatory in its response, this tendency in some cases reaching a point where the control breaks into sustained oscillations in speed about the pre-set speed level. We have found that the reasons for this instability are as follows:

In helicopters, the rotor blade mechanism is generally located some distance from the power turbine drive and the drive connection therebetween usually contains torsionally flexible numbers such as relatively long drive shafts, flexible connectors, intermediate gear connections, and the like. This torsional flexibility in the driving connection between the power turbine and the rotor forms, in effect, a spring-drive connection in the driving system. The mass of the helicopter rotor itself is, on the other hand, generally relatively large in comparison with that of the power turbine and the intermediate drive members so that the rotor and its driving connection present a load comprising a spring mass system having a relatively low resonant or natural frequency and which, by reason of the desirability of minimizing power losses in the transmission, is usually very lightly damped. The rotor system does contain, however, some natural damping in the form of friction and internal losses, so that the torsional oscillations therein will damp out of their own accord if no energy is added to the system at the natural frequency of oscillation. A system of this kind, that is, a passive system in which the natural damping available causes oscillations to be damped out, is generally referred to as one which contains positive damping and will not in itself be capable of supporting sustained oscillations. On the other hand, a system which is capable of supporting sustained oscillations at a fixed magnitude is said to be critically damped whereas a system in which oscillations are caused to increase in magnitude is said to be negatively damped. Because of the losses inherent in all natural systems, both critically damped and negatively damped systems generally contain active elements, or, in other words, elements which are capable of adding energy to the system to make up for the losses which would otherwise cause each succeeding cycle of oscillation to be decreased in magnitude over each preceding cycle. On the basis of the foregoing, the helicopter rotor system can be said to be positively damped, but the degree of positive damping is relatively small because the losses in the system are small.

It will be appreciated that the engine speed control, which controls fuel flow to the gas generator portion of the engine and hence the rate of hot gas flow to the power turbine in response to changes in output speed, has the capability of increasing and decreasing the rate at which energy is delivered to the rotor system. Thus, cyclic oscillations in the speed of the rotor system cause the speed control to increase and decrease the power delivered to the helicopter rotor by the power turbine. The control system therefore represents an active element which, depending on the nature of its dynamics, can add and subtract energy to the rotor system in phase with the oscillations occurring at the natural frequency to sustain oscillation but to cause the oscillations to build up in magnitude. In such a case, the control system supplies an increment of negative damping sufficient in magnitude to overcome the magnitude of positive damping inherent in the rotor system so that the overal damping factor of the system may approach the critical level and become undesirably oscillatory in response or, in some cases, move into the negatively damped region where sustained oscillations of increasing magnitude are produced.

In cases of the kind just described, that is where the overal damping factor of the system is too small for proper operation or is actually negative, the situation may be improved by reducing the sensitivity of the control system, that is by decreasing the magnitude of the power changes produced by the speed control for given increments of speed error introduced to the control. This would mean that for a cyclic swing in speed of a given magnitude, the control would produce a smaller energy chain and thus supply less negative damping to the system. It will be appreciated, however, that reducing the sensitivity of the control system also reduces its ability to respond rapidly to normal system transients. In many cases, therefore, such a solution is not available.

In view of the foregoing, it is one of the objects of our invention to provide an improved speed control system for helicopters which automatically maintains the helicopter rotor speed substantially at a pre-set level, but in which the above-mentioned instability is eliminated or kept within acceptable limits without detrimentally compromising the performance of the control and without reducing its sensitivity below an acceptable limit.

Briefly described, we accomplish this, in accordance with one embodiment of our invention, by locating the speed sensing element of the speed control loop at a particular point in the rotor system between the rotor and the power turbine where the dynamics of the rotor system sensed at that point are matched to those of the speed control loop in such a manner that an overall positive damping factor of sufficient magnitude is achieved. In the usual case, we prefer to select this point to correspond as nearly as possible to the node of the spring mass system represented by the rotor drive system such that, upon occurrence of speed oscillations between the power turbine and the helicopter rotor, the resulting input signal to the speed control is minimized. If the speed sensing element is located exactly at the node of the rotor transmission system, it will respond only to errors in average speed and not to the oscillatory speed excursions. Under these conditions the control system is incapable of producing negative damping in the rotor system. It will be appreciated, of course, that particular configurations will not always permit the location of the speed sensor exactly at the node of the system and in such cases we locate the speed sensor at a convenient speed takeoff point sufficiently close to the node of the system such that the input to the speed control is below the critical level required to produce oscillatory characteristics in excess of the desired magnitude. We have also found that the speed sensor may in some cases be located at a point where the dynamic response introduced to the control system actually adds an increment of positive damping to the overall system.

Other objects and advantages of our invention will be apparent from the following description taken in connection with the accompanying drawings in which.

Figure 1:
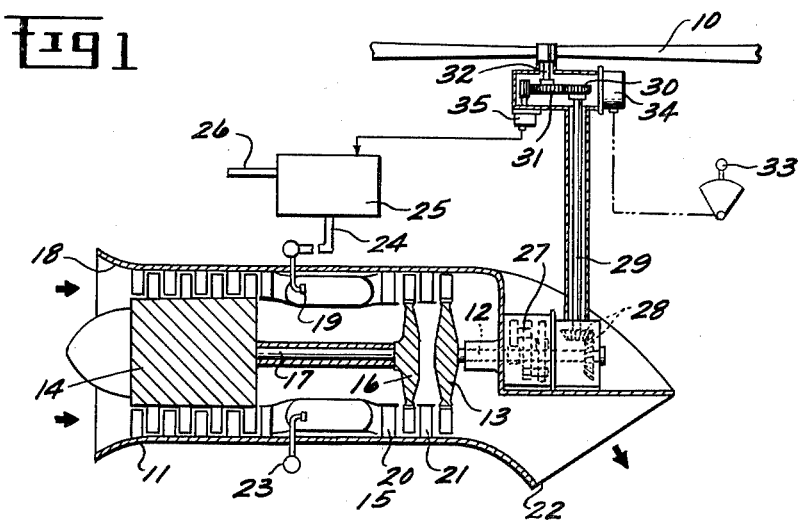
FIG. 1 is a schematic presentation of a helicopter rotor drive installation including a turboshaft engine and associated transmission, together with a speed control system embodying our invention.

Referring to FIG. 1 there is shown a helicopter rotor and power plant installation wherein a rotor 10 is driven by a turboshaft engine 11. The turboshaft engine 11 is of the free turbine type in which the engine output power is delivered to an output shaft 12 connected to a free power turbine 13. The gas generator portion of the engine includes a compressor 14, an annular combustion chamber 15, and gas generator turbine 16, which is connected to drive the compressor 14 through a shaft 17.

Air is drawn into the compressor 14 through an inlet 18, compressed in the compressor 14 and delivered to the combustion chamber 15, where fuel is injected through fuel nozzles 19 and combusted with the air. The combusted gases are delivered to the gas generator turbine 16 through a nozzle diaphragm 20 where energy is extracted to drive the compressor 14. The gases discharged from the gas generator turbine 16 are delivered to the free power turbine 13 through a nozzle diaphragm 21 to generate the output power of the engine. The gases discharged from the free power turbine 13 are ducted to exhaust through an exhaust casing 22.

Fuel is delivered to the fuel nozzles 15 through a manifold 23 which is connected to receive fuel through suitable conduit means 24. The fuel flow rate is controlled by a fuel flow control system 25 in response to a number of parameters such as throttle setting, compressor discharge pressure and speed. Fuel is supplied to the fuel control 25 through a conduit 26 connected to the fuel supply source.

The power turbine 13 is connected to drive the helicopter rotor 10 through a transmission system, which in the particular embodiment illustrated in FIG. 1, includes a main reduction gear 27, a pair of bevel gears 28, a transmission shaft 29, and spur gears 30 and 31, spur gear 31 being connected to drive the rotor shaft 32. Although it will be appreciated that particular transmissions will vary in configuration from that shown, they will generally include gear reduction elements and one or more torsionally flexible transmission shafts such as shaft 29. Thus it will be seen that in a typical installation, the power turbine 13 and the helicopter rotor 10 are interconnected by a transmission system having appreciable torsional flexibility.

It has been a common practice in systems of this kind to provide a speed control system for the engine which automatically maintains the speed of the engine at some pre-set level which is selected by the pilot. This pre-set speed may vary slightly because of the droop characteristic of the control and other factors, but it is the general intent in such a system to regulate and maintain the speed substantially at a pre-set level regardless of changes in load, subject to small variations which may be introduced by such factors as a droop characteristic. The pitch of the rotor blades 10 is controlled manually by adjustment of the pitch control lever 33, which is connected to a pitch control system 34.

The philosophy of operation of a control system of this general type may be set forth as follows:

The engine speed is set at some pre-selected level by the pilot and the pitch control lever is then manually adjusted to vary the amount of power delivered to the rotor. If the pitch of the rotor blades 10 is increased, thus increasing the load, the speed of the power turbine 13 begins to decrease. This produces a speed error signal in the speed control which increases fuel flow to the engine to maintain the pre-set speed, thereby increasing the power output of the engine. Conversely, when the pitch is decreased, the resulting increase in speed produces a speed error signal in a direction to decrease fuel flow and return the engine to the pre-set speed, thus reducing power output. Speed control systems of this general type are well known in the art, typical examples of such a system being shown and described in U.S. Patent 2,854,818—Fortmann et al., and U.S. Patent 2,857,741—Evers.

Now, it has been a common practice in systems of this kind to mount the speed sensing element of the speed control on the engine so as to sense the output speed of the power turbine 13 at its output shaft 12. In view of the foregoing discussion, it will be appreciated that in such a case, the speed sensor is in effect located at one end of the spring mass system formed by the power turbine, the helicopter rotor and the intermediate transmission. Assuming therefore that the rotor transmission system exhibits the torsional flexibility common to transmission systems of this kind, load transients and other system disturbances will cause oscillatory responses in the system, resulting in power turbine speed oscillations which will be picked up by the speed sensor. Because of time lags in the speed control loop, there is a tendency for the speed corrective signal to provide an energy input to the rotor transmisison system which has a component in phase with the oscillations, thereby tending to sustain the oscillations and in some cases, actually causing them to increase in magnitude. In other words, the losses inherent in the transmission system which normally provide a positive damping ratio are equalled or exceeded by the in phase energy input from the control system.

Figure 4:
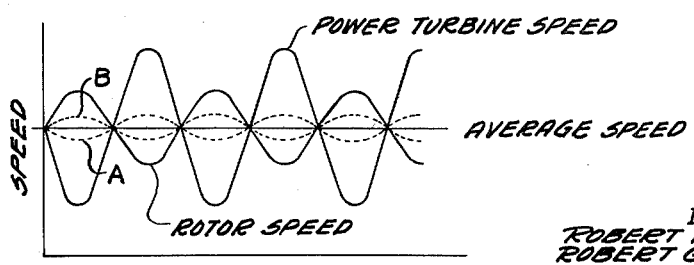
FIG. 4 represents the oscillatory characteristics of rotor speed and power turbine speed in a critically damped system.

FIG. 4 shows a typical characteristic of power turbine and rotor speed oscillations as a function of time for the critically damped case, that is, where the energy losses in the transmission are exactly equaled by the energy added to the system by the speed control, with the oscillations being consequently sustained at a fixed magnitude. Because the mass of the power turbine, even when reflected through the transmission gear ratio, is generally less than the mass of the rotor itself, the speed excursions of the power turbine are greater than those of the rotor as illustrated. Neglecting the non-linearities in the system, the speed oscillations of both the power turbine and the rotor are substantially symmetrical about the average speed of the system which occurs at the node of the system.

Figure 2:
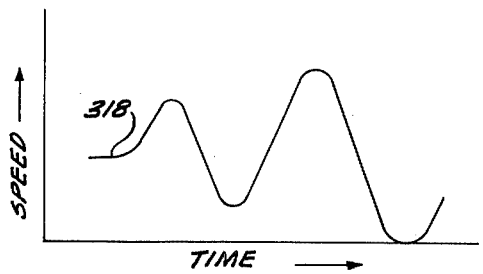
FIG. 2 is a graphical representation of the response characteristic of a negatively damped system.
Figure 3:
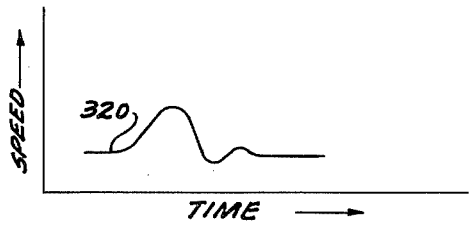
FIG. 3 represents the response characteristic of a speed control having net positive damping.

FIG. 2 shows the characteristics of the rotor speed as a function of time in response to a system transient where the overall system is negatively damped. It will be observed that in this case each oscillation is increased in magnitude over the next preceding one, that is, the energy added by the control during each cycle exceeds the losses in the system. The response of a positively damped system is shown in FIG. 3.

We have found that the foregoing oscillatory characteristics inherent in a helicopter drive system having torsionally flexible connecting members in the transmission may be controlled by locating the speed sensor element of the speed control loop at a particular point in the transmission system such that the speed oscillations sensed at that point are insufficient in magnitude to sustain the oscillations through the speed control loop. In view of the relatively large mass of the helicopter rotor in comparison with the reflected mass of the free power turbine, we have found that the node of the transmission system will generally occur at a point relatively close to the rotor. Thus, in the embodiment of our invention shown in FIG. 1, we have located a speed sensor element 35 at a point in the system where the speed of the helicopter rotor hub is sensed. The speed sensor 35 is of the electrical type, although it will be realized that the type of speed sensor used is not critical to our invention. Because of the considerably larger mass of the rotor, a correspondingly smaller torsional deflection is required on the rotor side of the system node than on the power turbine side to accommodate a given increment of stored energy. In the particular embodiment of our invention shown in FIG. 1, the torsional flexibility in the rotor blades themselves, including that occurring in the blade lag hinges, together with the flexibility in the hub shaft 22 is sufficient, in relation to the flexibility in the remainder of the system and the ratio of the masses of the rotor and power turbine, to establish the node approximately at the rotor hub as shown.

Thus, the purely oscillatory components of speed excursions picked up by the speed sensor 35 are substantially less in magnitude than would be detected at either end of the system, that is, at the rotor or the power turbine. Assuming, for the purposes of illustration, that the sensor 35 is located near the node of the system but not exactly at the node, the oscillatory speed component picked up by the sensor will be substantially less than that which would occur at the power turbine, being of a general characteristic such as shown by curve A in FIG. 4 if the sensor is on the power turbine side of the node and of a characteristic such as shown by curve B if the sensor is located on the rotor side of the node.

The substantial reduction in the magnitude of the input to the control system of the oscillatory speed excursions produces a corresponding reduction in the amount of energy added to the oscillatory system through the control loop. This is accomplished without reducing the sensitivity of the control system or in any way compromising its ability to respond to normal system transients. We locate the speed sensing element of the control sufficiently close to the node of the system such that the oscillatory speed input to the speed sensor, as represented by curves A and B in FIG. 4, is below the critical level at which an undesirably oscillatory overall response characteristic would result. For the typical case, we have found that locating the speed sensor at or near the rotor hub provides an overall response characteristic which is acceptable, although it will be understood that the foregoing principles of our invention may be applied as we have indicated above to particular configurations wherein it may be found that other locations remote from the power turbine provide sufficient reduction in the oscillatory characteristic to produce acceptable results.

In view of the foregoing, it will be appreciated that while we have set forth a particular embodiment of our invention for purposes of providing a full and clear disclosure thereof, its teachings may be applied to configurations other than the particular one shown and that various changes, modifications and substitutions may be made in the embodiment presented without departing from the true scope and spirit of our invention as defined in the appended claim.

What we claim as new and desire to secure by Letters Patent is:

A helicopter rotor speed control system comprising a gas turbine engine connected to drive a rotor through a torsionally flexible transmission comprising means for controlling the fuel flow rate to said gas turbine engine, and speed responsive means including speed error sensing means for producing a signal in response to variations in the input speed thereof from a preset reference speed, said speed error sensing means being connected to respond to the speed of an element in said transmission located near the torsional node thereof, such that the magnitude of the torsional oscillations between said rotor and said gas turbine engine at the point at which the speed of the transmission is sensed is below the critical level at which said oscillations are sustained through the speed control system.

References Cited in the file of this patent
UNITED STATES PATENTS

| | | |
|---|---|---|
| 1,916,585 | Ricardo | July 4, 1933 |
| 2,625,789 | Starkey | Jan. 20, 1953 |
| 2,857,741 | Evers | Oct. 28, 1958 |

FOREIGN PATENTS

| | | |
|---|---|---|
| 1,176,197 | France | Nov. 24, 1958 |

OTHER REFERENCES

"The Oil Engine and Gas Turbine," Nov. 1953, volume XXI, No. 245, pages 279–282.